United States Patent
Woollett et al.

(10) Patent No.: US 7,821,420 B2
(45) Date of Patent: Oct. 26, 2010

(54) SIGNAL TRANSMISSION SYSTEM FOR A MEASUREMENT DEVICE

(75) Inventors: Martin Woollett, Bristol (GB); John Styles, Bristol (GB); John Liptrot, Gloucester (GB)

(73) Assignee: Renishaw PLC, Wotton-under-Edge (GB)

( * ) Notice: Subject to any disclaimer, the term of this patent is extended or adjusted under 35 U.S.C. 154(b) by 1088 days.

(21) Appl. No.: 10/539,344

(22) PCT Filed: Dec. 18, 2003

(86) PCT No.: PCT/GB03/05516

§ 371 (c)(1),
(2), (4) Date: Jun. 16, 2005

(87) PCT Pub. No.: WO2004/057552

PCT Pub. Date: Jul. 8, 2004

(65) Prior Publication Data

US 2006/0215614 A1    Sep. 28, 2006

(30) Foreign Application Priority Data

Dec. 23, 2002    (GB) ................. 0229763.8

(51) Int. Cl.
*G08C 19/16* (2006.01)

(52) U.S. Cl. .................. 340/870.01; 340/870.16; 340/870.17; 340/870.18; 340/870.19; 340/870.2; 340/870.21; 340/870.22; 340/870.23

(58) Field of Classification Search ........ None
See application file for complete search history.

(56) References Cited

U.S. PATENT DOCUMENTS

| 4,119,871 A | 10/1978 | Zibert |
| 4,153,998 A | 5/1979 | McMurtry |
| 4,435,905 A | 3/1984 | Bryan |
| 5,279,042 A | 1/1994 | Gonzalez et al. |
| 5,949,352 A * | 9/1999 | Ferrari ............... 340/870.16 |
| 6,405,136 B1 * | 6/2002 | Li et al. ............... 702/10 |

(Continued)

FOREIGN PATENT DOCUMENTS

EP     0 506 318 A1    9/1992

(Continued)

OTHER PUBLICATIONS

Japanese Official Notice of Rejection with English Translation; mailed Aug. 4, 2009.

(Continued)

*Primary Examiner*—Lester Kincaid
*Assistant Examiner*—Mehmood B Khan
(74) *Attorney, Agent, or Firm*—Oliff & Berridge, PLC (57) ABSTRACT

A transmission system for a measurement device on a coordinate positioning apparatus comprises a station (18) mounted on the measuring device (10) and a station (20) mounted on the coordinate positioning apparatus (22), wherein the stations communicate with each other using a spread spectrum radio link, for example frequency hopping. The station on the probe sends a regular signal and on receiving the signal the station on the coordinate positioning apparatus synchronises its clock and sends an acknowledgement signal. Measurement data is either sent in the regular signal or in a measurement event driven signal.

20 Claims, 6 Drawing Sheets

U.S. PATENT DOCUMENTS

| | | | |
|---|---|---|---|
| 6,657,552 B2 * | 12/2003 | Belski et al. | 340/870.02 |
| 2002/0071478 A1 * | 6/2002 | Cornwall et al. | 375/132 |
| 2002/0175805 A9 * | 11/2002 | Armstrong et al. | 340/10.31 |
| 2003/0086095 A1 | 5/2003 | Ruck | |

FOREIGN PATENT DOCUMENTS

| | | |
|---|---|---|
| EP | 1 049 270 A2 | 11/2000 |
| EP | 1 112 810 A1 | 7/2001 |
| JP | A 11-94509 | 4/1999 |
| WO | WO 01/33714 A1 | 5/2001 |
| WO | WO 01/84076 A1 | 11/2001 |

OTHER PUBLICATIONS

European Office Action dated Nov. 25, 2009.
Japanese Office Action mailed on Jan. 8, 2010 w/English-language translation.

* cited by examiner

Probe station

Machine station

SIGNAL TRANSMISSION SYSTEM FOR A MEASUREMENT DEVICE

This invention relates to measurement device for use on coordinate measuring apparatus, such as a coordinate measuring machines (CMMs) machine tools, manual co-ordinate measuring arms and inspection robots. More particularly, it relates to signal transmission systems for such measurement devices.

A trigger probe for determining the position of a workpiece is described in U.S. Pat. No. 4,153,998. In use, the probe is moved by the machine relative to a workpiece. The probe has a deflectable stylus and delivers a trigger signal when the stylus contacts the workpiece. The trigger signal is indicated by the probe switching from one state to another. The trigger signal is used by the machine controller to freeze the outputs of scales or other measuring means which indicate the position of the probe. The position of the point of contact on the workpiece surface can thus be determined.

Especially on machine tools, it can be difficult to wire the probe directly to the machine controller, and so various wireless signal transmission systems have been developed in the prior art. These include inductive systems (where the signal is transmitted by electromagnetic induction between two coils), optical systems (where an optical emitter such as an infra-red diode is provided on the probe and produces an optical signal which is received by an appropriate receiver) and radio systems (having a radio transmitter in the probe and a radio receiver fixed at a convenient location on the machine). An example of a radio system is shown in U.S. Pat. No. 4,119,871. An important requirement of such probes is repeatability, i.e. that the same result should be achieved every time a given measurement is repeated. The mechanical position of the stylus in the probes described in U.S. Pat. No. 4,153,998 is extremely repeatable in space, an instant of production of the trigger signal always has a definite, repeatable relationship with the instant of contact between the stylus and the workpiece. This means that accurate results can be obtained from the probe by a simple calibration procedure.

However, the accuracy would be destroyed if the signal transmission system were not repeatable, that is, if there were an unknown, variable delay in the signal transmission. If this occurs then the probe would travel an unknown variable distance after the instant of generation of the trigger signal before the machine control is able to freeze the outputs of the measuring means. There is then an error between the position of contact and the position indicated by the frozen outputs and this error is an unknown variable quantity which cannot be removed by calibration. Thus, in order to maintain overall accuracy of the probe system there is the problem of ensuring that any transmissions delays introduced by the signal transmission system are repeatable i.e. the same delay should be introduced every time the probe is triggered. The probe calibration procedure mentioned above will then also remove this repeatable delay caused by the transmission system.

U.S. Pat. No. 5,279,042 discloses an analogue radio signal transmission system for a probe in which the probe is provided with a transmitter for producing a carrier signal onto which a probe signal may be modulated. A receiver receives the probe data and produces a probe output signal derived from the transmitter data. A clock on the transmitter provides a time standard for the whole system, the receiver uses an oscillator with a phase comparator at its input to ensure that the oscillator is permanently synchronised with a clock in the transmitter. When a probe signal occurs, the time elapsed between the start of a counter cycle and the change of state of the probe is latched in a shift register and transmitted serially.

This method has the disadvantage that as the transmitter transmits a continuous signal which is required to synchronise the transmitter and receiver the system uses a significant proportion of the probe battery power and thus reduces the battery life.

Furthermore, in a fixed frequency system, the number of available communication channels is equal to the limited number of frequency channels. There is therefore the problem of receivers from other systems which use this frequency channel intercepting the transmission sent from the probe. In addition, the presence of radio traffic may affect the transmissions.

The present invention provides a transmission system for a measurement device for a coordinate positioning apparatus, comprising:

a first station for mounting with one of the measuring device and the coordinate positioning apparatus;

a second station for mounting with the other of the measuring device and the coordinate positioning apparatus;

Wherein the first and second stations communicate using a spread spectrum radio link.

The spread spectrum radio link has the advantage of reducing the chance of unwanted receivers intercepting a transmission, and increasing the chance of a transmission getting through to the correct receiver in the presence of unwanted radio traffic.

The first and second stations communicate with one another using a spread spectrum radio link. This is a technique which takes a narrow band signal and spreads it over a broader portion of the radio frequency band. Two types of spread spectrum radio link comprise frequency hopping and direct sequencing. In frequency hopping the signal is spread by hopping the narrow band signal as a function of time. In direct sequence, the signal is spread by mixing it with a special code.

The use of a periodic signal rather than a continuous signal increases battery life.

The measurement device may comprise a measurement probe, for example a touch trigger probe.

Preferably the transmission system uses a world-wide frequency band.

The first and second stations may be provided with a clock, wherein the clocks are synchronised at least once. The first station may transmit a regular transmission and wherein when the second station receives the signal it may synchronise its clock with the first station. If a signal transmitted by the first station is not adequately received by the second station, the signal may be retransmitted by the first station.

If the second station receives the signal transmitted by the first station, it may transmit an acknowledgement signal. If the first station does not receive an acknowledgement signal in response to its signal, it will re-transmit said signal. The ability to re-transmit messages which have not been received enables the system to be capable of operating in a noisy environment.

Preferably the transmission system comprises a half duplex link.

In the event of a measurement event, the first station may transmit information relating to said measurement event. The measurement event may comprise a touch trigger event. The information may include data relating to the time of the measurement event. The first station may transmit a regular transmission and information relating to the measurement event may be transmitted in an additional transmission.

The signal transmitted by the first station contains information relating to the measurement device, the measurement device output signal in the second station may be produced after a time delay. This time delay is chosen so that it is long enough to allow retransmissions of the signal within the time delay.

A master clock is provided at one end of the transmission system and a sliding correlator is provided to recover the master clock. This provides a reference for the measurement device) output signal time delay (e.g. a probe trigger output time delay). If the second station receives a signal from the first station it transmits an acknowledgement signal, the acknowledgement signal sent to the first station is synchronised with the master clock. This removes the need for clock recovery at the first station.

In a preferred embodiment, signals sent between the first and second stations comprise data bits and data bits relating to more important information are provided with greater error protection than other data bits. The data bits relating to more important information may be provided with a higher hamming distance than other data bits.

Preferably, the first station transmits regular signals and wherein the first station has a mode and wherein each regular signal asks if the first station should change mode, and wherein if the first station receives an affirmative response, it changes mode. A mode may comprise a power saving mode in which the regular signals are sent at a slower rate than the normal mode. This minimises power consumption and is sufficient to allow the second station to maintain synchronisation with the first station.

Preferably, if the first and second stations are not synchronised, the first and second stations will hop between frequency channels at different rates until second station receives the signal and synchronises with the first station. If the second station detects background noise above a predetermined level on the selected frequency channel, it will change to a different frequency channel.

A second aspect of the invention provides a transmission system for a measurement probe for a coordinate positioning apparatus, comprising:
a first station for mounting with one of the measuring device and the coordinate positioning apparatus;
a second station for mounting with the other of the measuring device and the coordinate positioning apparatus;
wherein the first and second stations may communicate on different frequency channels and wherein if the second station hears significant noise on a certain frequency channel, it will hop to another frequency channel.

Preferred embodiments of the present invention will now be described by way of example with reference to the accompanying drawings wherein.

Figure 1:
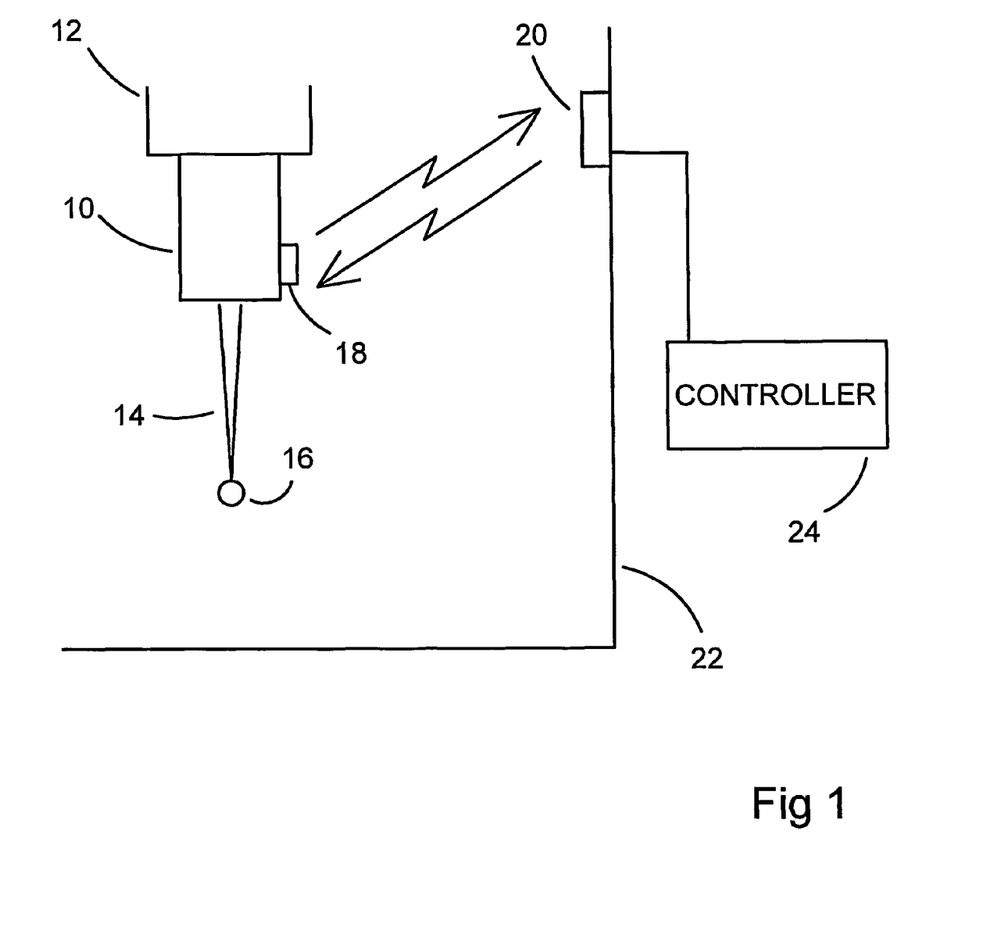
FIG. 1 illustrates a touch trigger probe mounted on a machine tool.

FIG. 1 illustrates a touch trigger probe 10 mounted on a spindle 12 of a machine tool. The touch trigger probe 10 has a deflectable stylus 14 with a workpiece-contacting tip 16. The signal transmission system comprises two stations, the probe station 18 is connected to the touch trigger probe and is mounted to a moving part of the machine tool. A machine station 20 is mounted on a stationary part 22 of the machine tool structure and is connected to the machine tool controller 24.

Data is transmitted between the probe station 18 and machine station 20 using a spread spectrum radio link, in this case a frequency-hopping radio communications link, which sends discrete packages of serial binary data.

Both the probe and machine stations hop between different frequency channels roughly in synchronisation with each other with occasional messages sent between them to synchronise the two stations. The probe station initiates each exchange of messages and receives a reply from the machine station.

The frequency-hopping and synchronisation will now be described in more detail with reference to FIG. 2. The machine station is listening for messages most of the time whilst the probe station is in its half-on condition most of the time (e.g. as in slots n+1 to n+3 above). When the probe station is half-on its probe interface and microprocessor will be on and the radio modem will be off. The probe interface and microprocessor each use about 2 mW of power whilst the radio modem uses significantly more power, about 120 mW when switched on. The radio modem consumes a similar amount of power whether it is receiving or transmitting. The half-on state thus minimises power consumption of the battery powered probe system.

Figure 2:
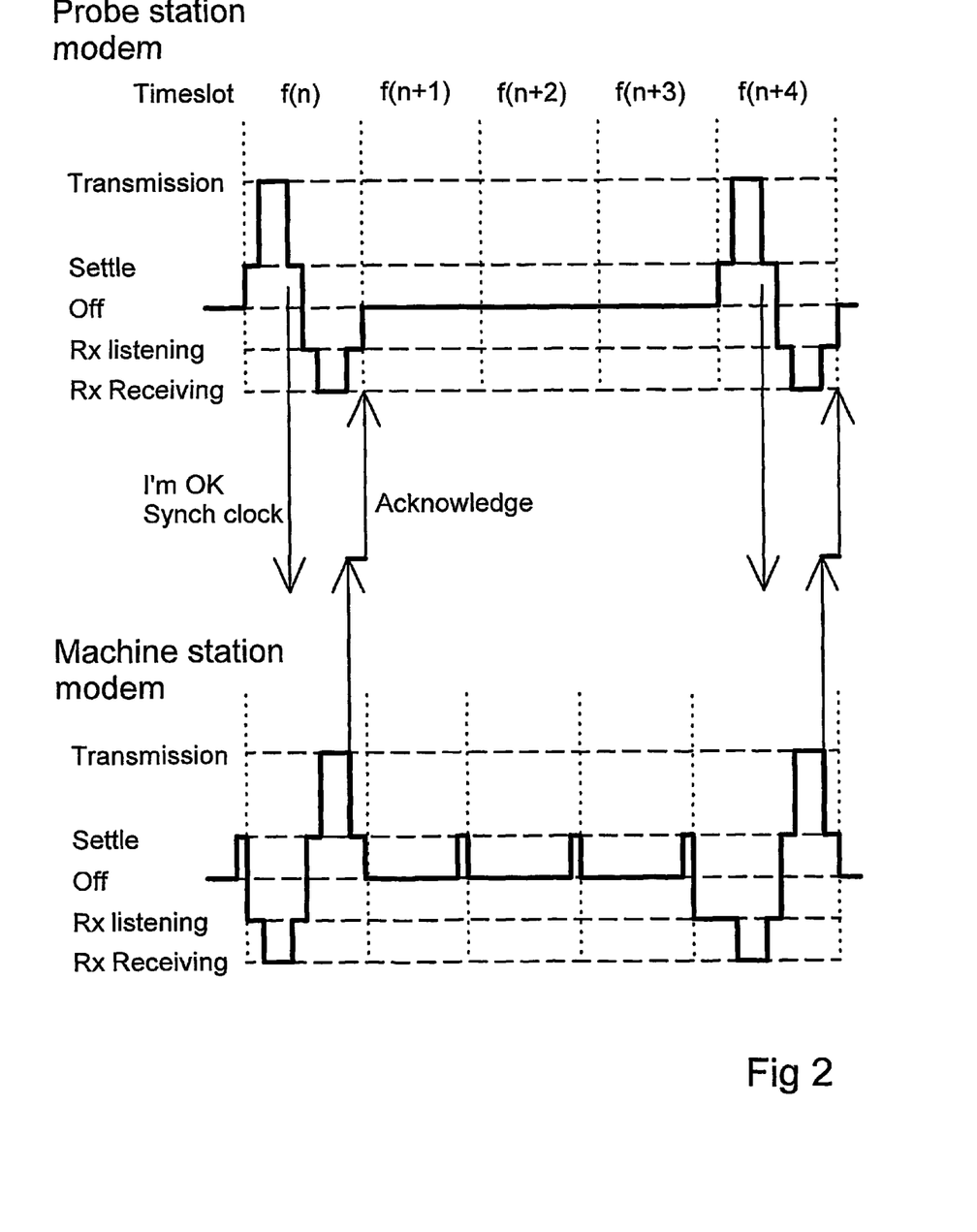
FIG. 2 is a schematic illustration of the frequency hopping and synchronisation of the first and second stations.

FIG. 2 shows the probe station turning on with a small settling time and then transmitting an "I'm OK" message on frequency channel f(n). The probe station then listens for the acknowledgement from the machine station. The machine station which is listening on channel f(n) receives this message, synchronises its clock with the probe station and then sends an acknowledgement back on channel f(n). Upon receiving this acknowledgement the probe station switches back to its half-on condition. The probe station clock therefore acts as the master clock for the system. When the machine and probe stations are synchronised, they hop between frequency channels at the same time.

The probe station is now silent for a number of time slots (assuming there are no probe triggers) and the machine station listens on successive frequency channels f(n+1), f(n+2) etc. Although the probe station is not transmitting on the successive frequency channels f(n+1), f(n+2) etc, it is still hopping between frequency channels. FIG. 2 shows an exaggerated error in clocks between the probe and machine stations. This error is small enough to allow the stations to remain synchronised to the order of 100 silent time slots. Thus although because of this error the machine and probe stations hop to a new channel at a slightly different time, the error is small enough that there is sufficient overlap when the probe station is transmitting and the machine station is listening in the same frequency channel for signals to pass between the stations. This error is corrected each time the machine station receives a message from the probe station.

For clarity FIG. 2 only shows three silent slots and thus three frequency-hops are unused. The periodic timer then prompts the probe station to transmit again on f(n+4) and this cycle then repeats until interrupted by some other event (e.g. a lost transmission, a probe trigger or a probe station turn-off signal).

Figure 3:
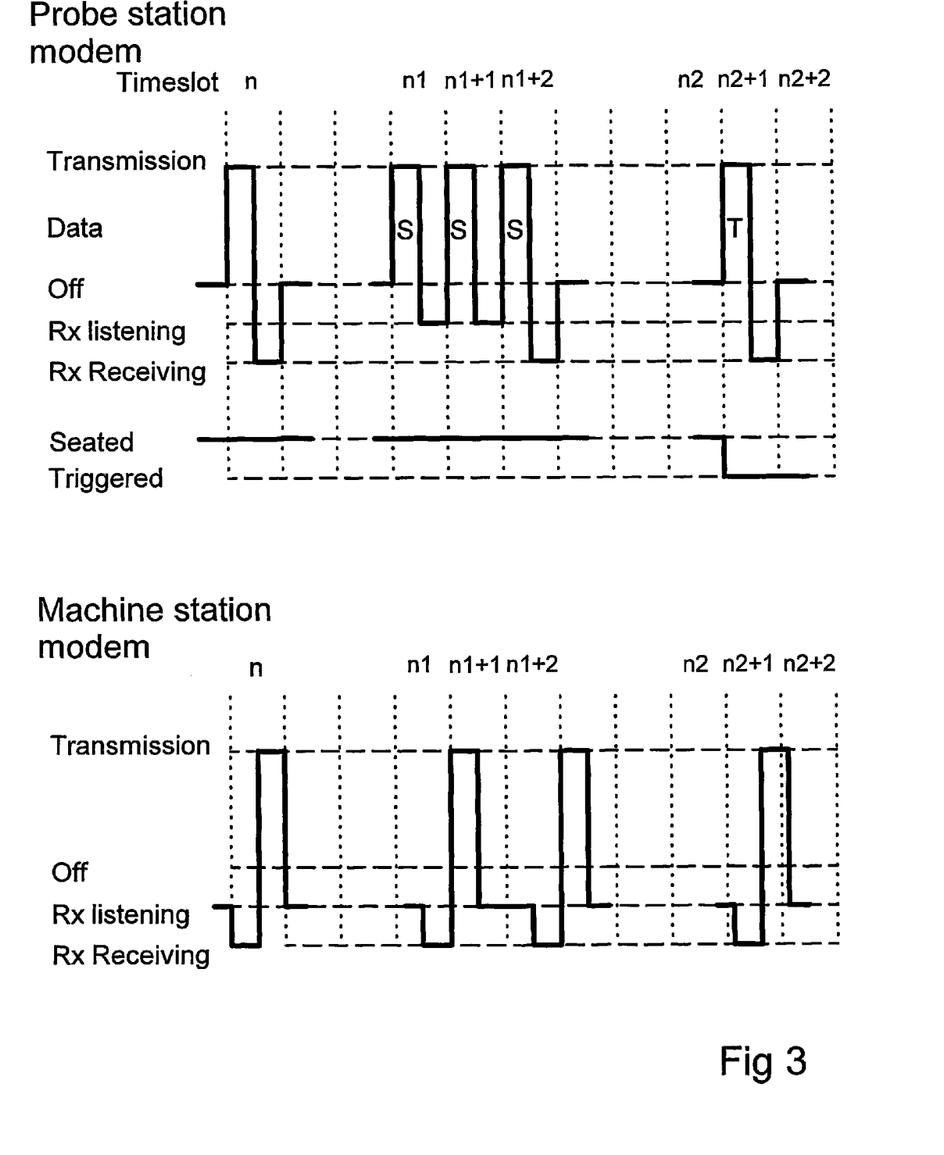
FIG. 3 is a schematic illustration showing lost hops and event interruptions.

Transmissions from the probe station may not be received by the machine station due to for example interference. Such a situation will now be described with reference to FIG. 3. In FIG. 3 settling time is not shown and the effects of synchronisation of clocks and hopping between the probe station and machine station is assumed.

The transmitted radio packet from the probe station includes probe data. For example, the probe may be seated (S) or the probe may have triggered (T). Other information may also be transmitted in the radio packet, for example the condition of the battery, how many transmissions have been attempted for this message and data relating to the time of a touch trigger event.

In time slot n a successful message from the probe station and reply from the machine station, all on frequency channel f(n) is shown. This confirms that both the probe station and radio link are operating and that the output from the machine station can be trusted.

In time slot n1 the probe station transmits a message, the machine station receives this message and sends an acknowledgement. However the probe station does not receive this reply for example due to interference.

As no acknowledgement is received the probe station will re-transmit the message in the next time slot n1+1. FIG. 3 shows the re-transmission of the message from the probe station in time slot n1+1. However, as the machine station receives nothing, it does not send an acknowledgement. The probe station will therefore receive no message and so will re-transmit the message in slot n1+2.

In time slot n1+2 everything works. The machine station receives the probe station message and the probe station receives the machine station acknowledgement. The probe station can therefore return to its half-on condition with its radio modem off.

If however after a predetermined time the machine station does not receive the message from the probe station then either the radio link or the probe station has failed and the machine station will set an error output.

For the first transmission of a message, a normal radio frequency power level is used, for example 1 mW. On subsequent re-transmissions, the radio frequency power level may be increased, thus increasing the chance that the message will get through.

As there is the opportunity of re-transmission at a higher radio frequency power, this enables a slightly lower radio frequency power to be used for normal transmissions. This has the advantage of minimising radio traffic and extending battery life.

In time slot n2 in FIG. 3, a probe trigger occurs. An out of sequence transmission must be sent by the probe station to the machine station as soon as possible. The probe station transmits a probe trigger message to the machine station in the next time slot n2+1. As before, the machine station acknowledges the message. A probe trigger message outranks the periodic update and thus when a probe trigger occurs data relating to the probe trigger will be included in the data packet sent in the next transmission.

Figure 4:
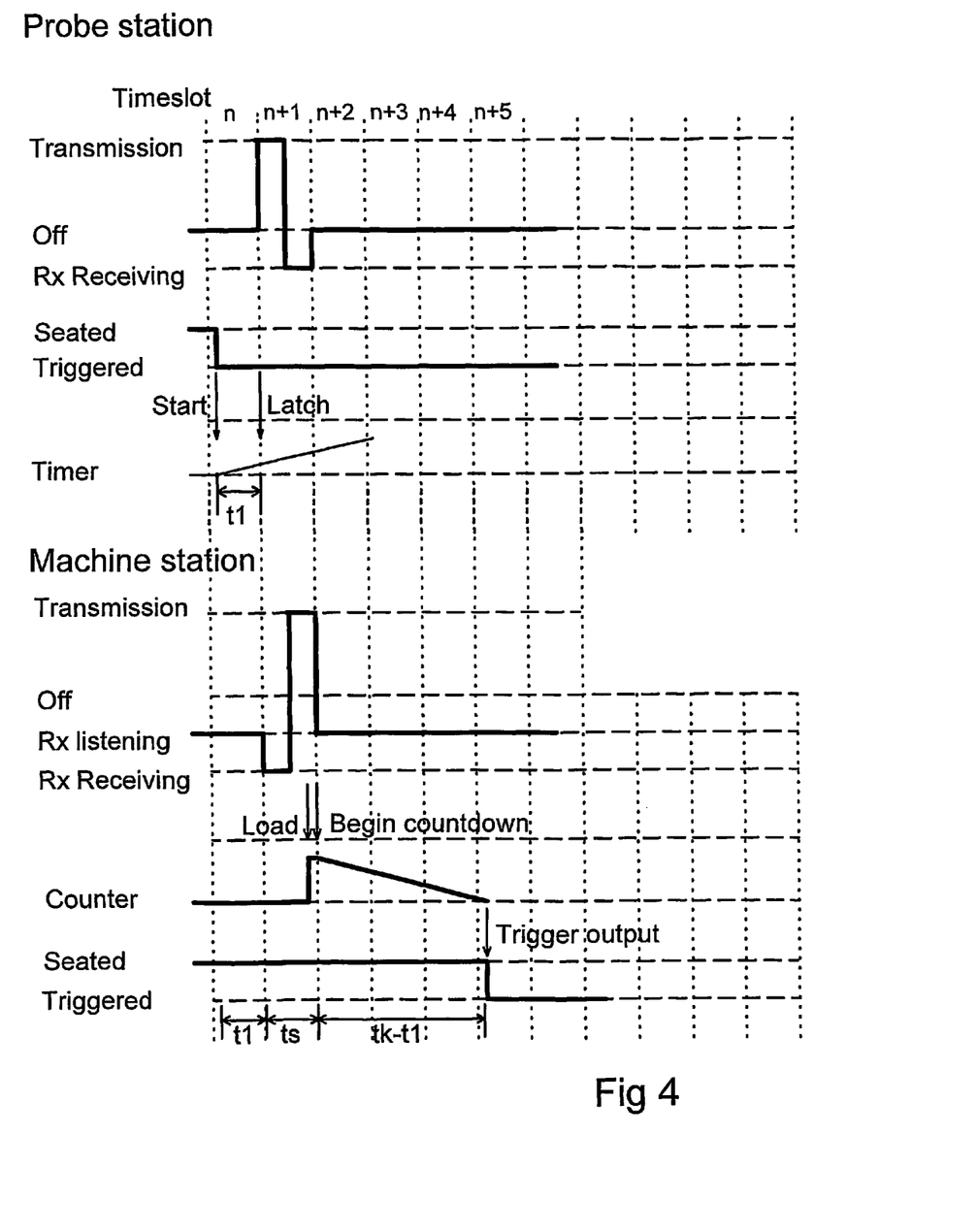
FIG. 4 is a schematic illustration showing a probe trigger and delay counters.

As illustrated in FIG. 4, when a probe trigger occurs a timer in the probe begins counting from zero. The value of this timer t1 is latched at the beginning of the next time slot n+1. This value t1 is transmitted from the probe station to the machine station in a transmission in the next time slot n+1.

The machine station decodes this value t1 from the transmitted message and computes a value tk−t1 where tk is a constant. The machine station loads its own countdown counter with the value tk−t1. At the end of the time slot n+1 the countdown counter is started and when it reaches zero the probe status output changes to triggered.

The time delay between the probe trigger and the machine station probe output will therefore be t1+ts+tk−t1=ts+tk, where ts is the time of one time slot. This value ts+tk is constant. The delay between probe trigger and machine station probe output is therefore always the same.

The time constant tk is selected to allow re-transmission of the message if the first transmission (i.e. in time slot n+1) fails. In FIG. 4, time slots n+2, n+3 and n+4 are available for re-transmission of the probe trigger message. For a re-transmission a correction is applied to tk−t1 equal to the time taken by the number of unsuccessful transmissions. This correction will be the number of retries done multiplied by the length of a single time slot. The message transmitted by the probe station will include data which indicates which try it is (1st, 2nd, 3rd, etc). Alternatively the probe station can (re-)latch the probe station counter at the beginning of each time slot in which a message will be sent. (This value will be t1+ts for a message sent in slot n+2, t1+2*ts for a message sent in slot n+3 and so on.) Thus whichever time slot the message is successfully transmitted in, the total time delay will be constant (=ts+tk) between the probe trigger and the machine station probe status output.

For the probe station and machine station to communicate they must both be set to the same frequency channel at the same time. To achieve this the probe station frequency channel controller and the machine station frequency channel controller must be synchronised. This is achieved by a synchronisation recovery/find and collect process described below with reference to FIG. 5.

The probe station is shown hopping between frequency channels at normal speed (e.g. one hop per millisecond) and the machine station is shown hopping at a much slower speed (e.g. one hop per 50 milliseconds). The probe station transmits in every time slot (n,n+1,n+2 etc) and then listens for a reply before hopping to the next time slot. The probe station transmission contains the ID number of the probe and includes a request for synchronisation and acknowledgement of the message. The machine station listens for many probe station time slots and occasionally changes to a different frequency channel. In time slots n,n+1 and n+2 in FIG. 5 the probe station is shown transmitting on successive different frequency channels whilst the machine station listens. However whilst the machine station is on a different frequency channel to the probe station it receives nothing.

Figure 5:
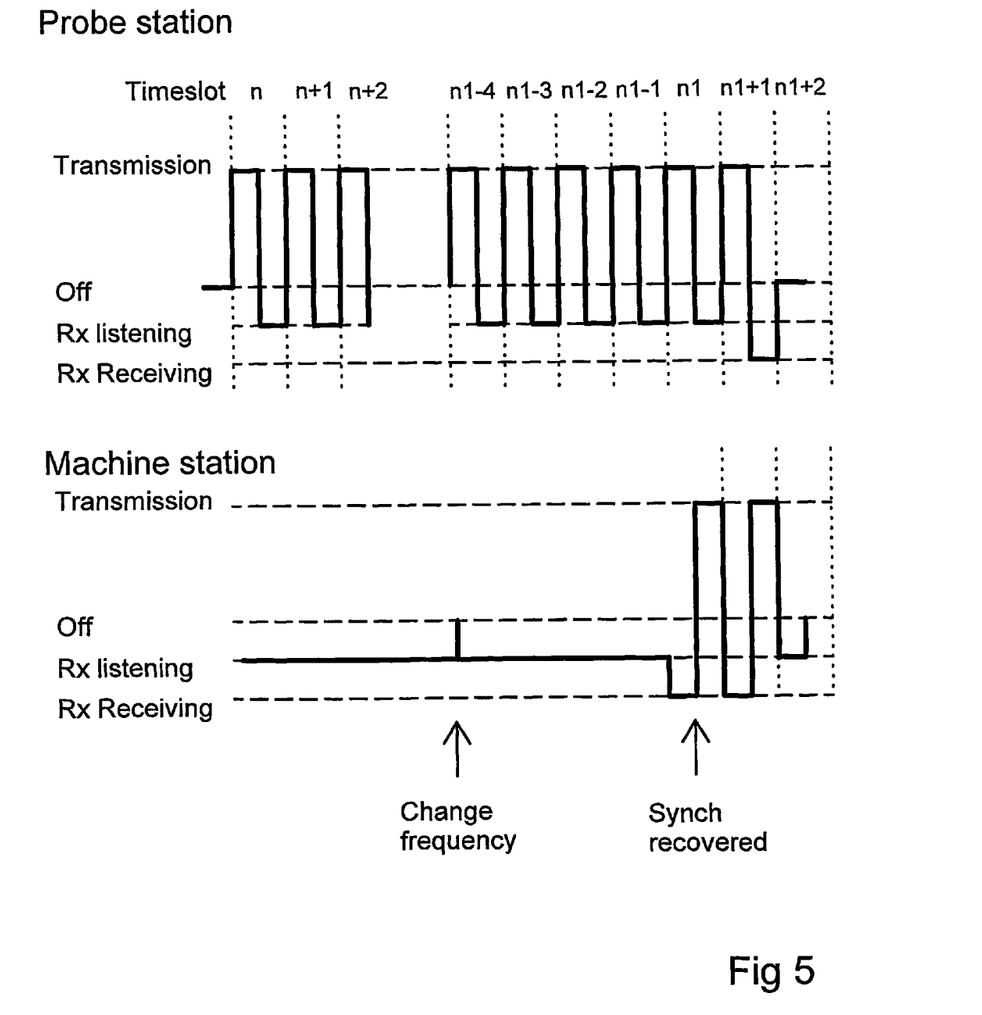
FIG. 5 is a schematic illustration showing synchronisation recovery.

In time slot n1−4 the machine station is shown hopping to a new frequency. Meanwhile the probe station continues hopping frequency channels and transmitting. In slot n1 the probe station and the machine station are on the same frequency channel and the machine station hears the message from the probe station and synchronises its time slot clock to the probe station. The machine station is now synchronised with the probe station and a periodic handshake to maintain synchronisation can now occur. The machine station acknowledges the message from the probe station in the time slot n1.

Usually the acknowledge message from the machine station will be received by the probe station. However FIG. 5 illustrates what happens if the probe station fails to hear the acknowledgement. In time slot n1 the machine station transmits an acknowledgement but although the probe station is listening it does not receive the acknowledgement. The probe station hops to the next time slot n1+1 and again transmits its message. As the machine station is synchronised it will be listening on the correct frequency channel in time slot n1+1 and will thus hear the message from the probe station. The machine station will synchronise its clock again and will acknowledge the message again. The probe station message in slot n1+1 is effectively a re-transmission as shown in FIG. 3.

During the process of synchronisation recovery, if the machine station hears significant noise on a certain frequency channel, it will immediately hop to another frequency channel rather than wait on the frequency channel where background noise may swamp any transmission from the probe station.

It is desirable to be able to turn on the probe station via a radio message from the machine station. Whilst waiting for this radio turn-on the probe station is in its radio standby mode in which it consumes substantially less battery power than when it is in its operating mode.

The probe station radio standby mode is similar to the periodic update, although the time slots may be wider and the cycle time longer, i.e. slow hopping between frequency channels.

Most of the time the data exchange will consist of the probe station transmitting its ID number and asking it if should be turned on, whilst the machine station replies that it is not needed. As with the operating mode the machine station is synchronised to the probe station during this exchange. If the probe station does not receive an acknowledgement from the machine station it will re-try to transmit the message in subsequent time slots in different frequency channels.

If it is required to turn-on the probe station, the machine station will reply "turn-on" and change to operating mode. The probe station will then switch to the operating mode. In the operating mode the machine station will maintain synchronisation with the probe station as described above.

Turn-off will require an exchange of messages as the turn-off request may come from the machine station or alternatively from the probe station (for example a time out). Following turn-off both probe and machine stations will return the synchronised slow hopping described above.

As discussed earlier, the radio signals between the probe and machine stations consist of message packets of serial binary data. Each message contains a header which includes probe station identity data, or address, needed to enable the machine station receiver to recognise whether the message is intended for that receiver and to synchronise a clock in the machine station to the probe station clock.

The machine station uses a correlator to recognise the incoming message header.

Figure 6:
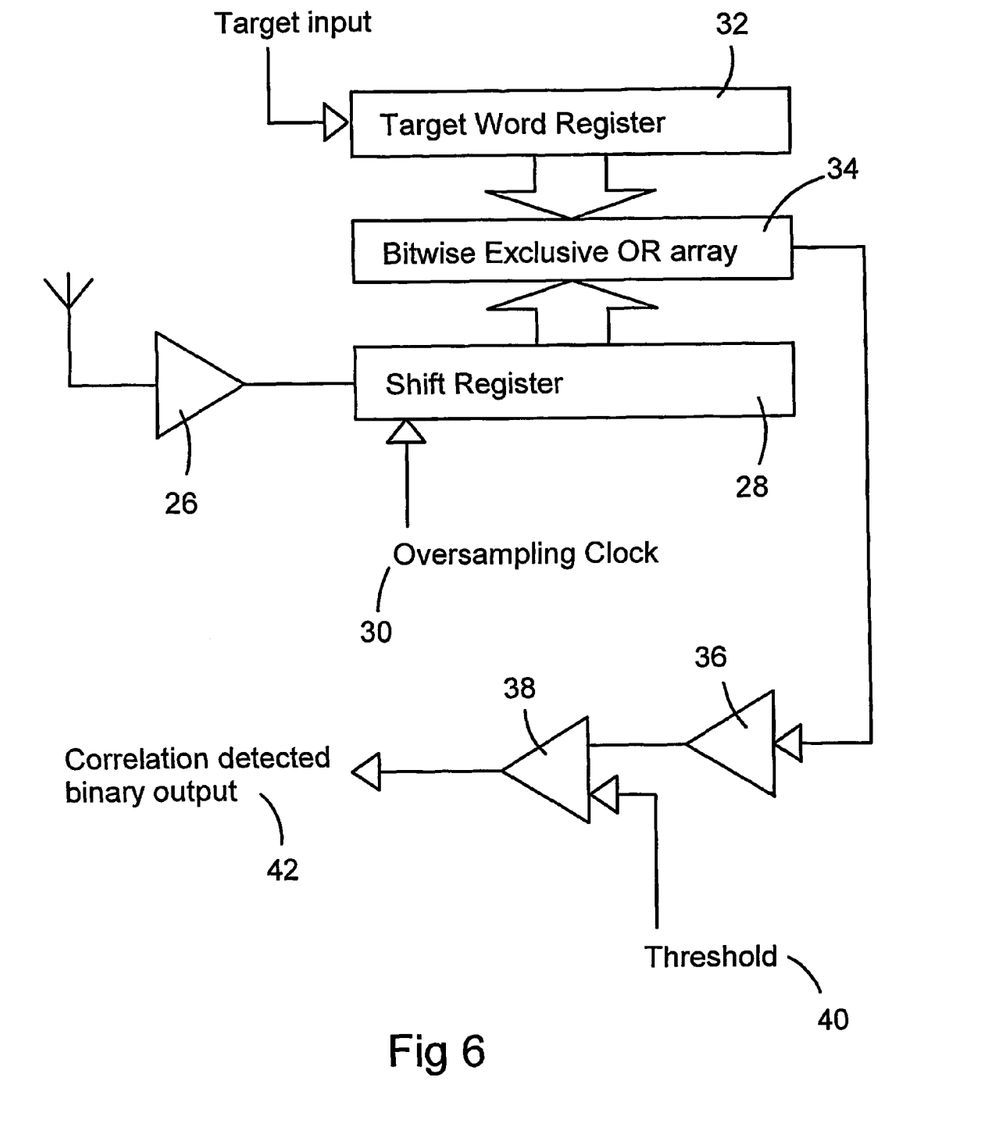
FIG. 6 is a schematic illustration of the sliding correlator in the machine station.

FIG. 6 illustrates the sliding correlator used in the machine station. A radio frequency receiver and de-modulator 26 receive radio signals transmitted from the probe station and output a serial stream of received data into a large shift register 28.

On each pulse of an oversampling clock 30, the incoming serial data stream is sampled and its value (1 or 0) is loaded into the shift register 28. Simultaneously the contents of the register are shifted right 1 bit, the last bit being shifted 'off the end' and lost.

A target word is held in a separate target register 32. The entire shift register contents are continuously, in parallel, bit to bit compared with the target register contents by an array of exclusive-or (EOR) gates 34. One EOR gate is used per bit of the shift register and the outputs of the EOR gates are added at an Adder 36 to determine the number of bit-matches detected.

The number of bit matches detected is then fed to a comparator 38, where it is compared with the required number of matches threshold 46, which is typically greater than 95%, to determine the correlation detected binary output 42.

The target word is programmable, thus the correlator can be set to detect different desired bit sequences. In particular, the target word is set to the expected header sequence which will be sent from the transmitter (i.e. the acquired partner probe station).

In a typical system the header could be a 32 bit word with a data rate of 1 bit/microsecond. The oversampling clock might run at 10 times the data rate, i.e. 10 MHz and the threshold could be 95% match. Thus the shift register would contain 10×32=320 flip-flops, and the EOR gate array would contain 320 EOR gates. The outputs of the 320 EOR gates would be fed to the adder, which would output a number between 0 and 320 to the comparator. To achieve a 95% or better match, the threshold would be set at 320×0.95=304 bits. Thus if 304 or more bits in the shift register matched their targets from the target word, the correlation detected output will be True, otherwise it will be False. This test is done and the correlation detected output updated on every pulse of the oversampling clock, i.e. every 100 nanoseconds.

The advantage of this system is that clock recovery is only required at one end of the half duplex link. The master clock is provided at the probe station. At the machine station, the sliding correlator is used to recover the clock data from the messages transmitted from the probe station. The sliding correlator provides a reference for the probe trigger time delay and allows acknowledgement messages to be sent already synchronised, thus removing the need for clock recovery at the master end of the link (i.e. at the probe station).

There are two main types of possible correlator errors. The correlator may fail to identify a transmitted message, described above or a correlator may report a match when no message has been transmitted.

If the machine station falsely believes that it has received a message from the probe station, this will result in loss of the synchronisation of the machine station clock, failure of the radio link and an error message being produced. The probe station only listens for a machine station acknowledgement immediately after it has sent a message and the machine station acknowledgement is thus expected within a very narrow timeslot.

When in the operating mode, a failure will occur when noise imitates a machine station acknowledgement and thus prevents the probe station from re-transmitting the message. However the probe station is only vulnerable to this error when it is waiting for an acknowledgement which doesn't come.

The transmitted message contains several different items of information, such as probe station address, probe status (i.e. seated or triggered), timestamp (i.e. time of probe trigger) and battery status. Some of these items have high importance, such as the probe station address and the probe status. The timestamp has high importance if the probe status is 'triggered' but is otherwise not important. The battery status has low importance.

In order to optimise error protection of the transmission, the most important data bits of the message are encoded with a large hamming distance.

This allows small numbers of bit errors to be corrected and larger numbers of bit errors to be rejected. A higher hamming distance has the advantage of allowing some error correction but has the disadvantage that it increases transmission time. Less important data is provided with a lower degree of error protection, for example multiple bit error detection using a cyclic redundancy check.

For example, the probe station address and probe status data may be encoded with a hamming distance of 6, which could allow 1 bit error correction and 4 bit error detection. The timestamp and battery status may be encoded with a lower hamming distance of 4 which could provide 3 bit error detection.

The information required during the periodic transmissions (probe station address and probe status) thus has higher error protection than other information in the message. There are several empty timeslots between each periodic transmission which are available for re-transmissions if the transmission fails. However, if all these timeslots are used up by unsuccessful re-transmissions, an error signal will be produced and the whole system will stop. It is therefore advantageous to have a high reliability periodic transmission, leaving the empty timeslots as a safety buffer.

In the event that the probe status is 'triggered', the timestamp data becomes important. This data has a lower hamming distance and will be retransmitted if an error is detected.

There may be, for example, about 50 periodic transmissions per second and about 1 trigger per second. It is therefore more important to avoid re-transmissions on the periodic transmission than the trigger signal.

The system of using longer hamming distance codes for the more important data has the advantage that it reduces the number of retransmissions required for the periodic transmissions. As the lower priority data is given lower hamming distance codes, the transmission time is reduced. The radio traffic and battery life are thus also reduced.

A feature of the present invention is that once the probe station is in place, it will only communicate with its partnered machine station. This enables different systems to operate simultaneously in the same environment without interfering with one another. A partnering process transfers the probe stations unique 32 bit ID to the machine station. In a preferred embodiment of this process, when a probe is put onto a machine, the probe stations enters a 'Send Acquisition' mode. In this mode it transmits a message which includes its unique ID and a 'header' which is recognised by the machine stations. This message is transmitted periodically, for example once every 1 ms across all channels in its hopping pattern. In a next step, the machine station is powered on and in an initial time period, for example 10 seconds, it is receptive to the 'Send Acquisition' signal sent by the probe station. When the machine station receives the transmission in which it recognises the 'header', it reads the ID. The machine station saves the ID into its memory in the form of an EEPROM (electrically erasable programmable read only memory) and sends an acknowledgement back to the probe station which contains the same ID. If the probe station successfully receives an acknowledgement (without errors) containing its own ID, it stops the 'Send Acquisition' process. The probe and machine station are now successfully partnered and the machine station will only communicate with the probe station having this ID.

When the probe and machine stations are partnered (i.e. have the same ID), they will have the same channel hopping pattern and thus will be able to communicate whilst channel hopping.

The probe and machine stations of the transmission systems may transmit signals using worldwide licence free radio frequency bands. Examples of such bands are 2.4 GHz and 5.6 GHz. An advantage of this is that probe and machine stations may be set to function within these frequency bands during manufacture and then the same version of the probe may be used anywhere in the world.

In the above embodiment, the probe station sends out a regular transmission to the machine station. However an alternative would be for the machine station to send out a regular transmission requesting information and in response the probe station recording information (i.e. measurement and time information) and transmitting it to the machine station.

The above embodiment describes a regular transmission in which the probe and machine stations synchronise and an out of sequence event driven transmission which contains data about the touch trigger event. However, it is possible to include data relating to the touch trigger event in the regular sequence of transmissions and thus eliminate the requirement for out of sequence event driven transmissions. In this case, the data will need to contain information about the time of the touch trigger event.

This invention is not limited to touch trigger probes. This transmission system is also suitable for use with scanning probes. In this case the regular transmissions will include data relating to probe deflection and the time of that probe deflection.

Likewise, the transmission system is suitable for other measurement devices for use on coordinate positioning apparatus such as machine tools and coordinate measuring machines. A ball bar device is used for performing a calibration operation on machine tools and coordinate measuring machines and is described in U.S. Pat. No. 4,435,905. The device comprises an elongate telescopic bar provided with a ball at each end. In use, each of the balls is retained in a socket provided on the machine spindle and table respectively and the arm is then driven in a circular path about the centre of the ball retained in the socket on the table. A single axis transducer provided on the bar measures any variation in the centre-to-centre spacing of the balls, and thus determines the extent to which the tool holder path varies from a circular path. Data from the single axis transducer is relayed to the machine control via a cable but this has the disadvantage that it limits the number of rotations possible with the ballbar. By using the transmission system of the present invention, the transducer output and corresponding data may be transmitted in the radio signal, thus removing the need of the cable and allowing the ballbar to make several continuous rotations. This transmission system may be used on other measurement devices, such as temperature probes.

Although the above embodiment describes use of frequency hopping, other types of spread spectrum radio link are suitable for use in the invention, for example direct sequence.

The invention claimed is:

1. A transmission system for a measurement device for a coordinate positioning apparatus, comprising:
   a measurement device comprising a touch trigger probe;
   a first station for mounting with the measurement device; and
   a second station for mounting with the coordinate positioning apparatus, wherein
   the first and second stations communicate using a spread spectrum radio link, the spread spectrum radio link being a frequency hopping radio link in which the first and second stations frequency hop between a series of different frequency channels,
   in the event of a measurement event comprising a trigger event, the first station transmits information relating to the trigger event, including data relating to a time of the trigger event,
   when a signal transmitted by the first station containing information relating to the trigger event is received by the second station, the second station produces a measurement device output signal, with a time delay between the trigger event and the production of the measurement device output signal,
   when the signal transmitted by the first station is not adequately received by the second station, the signal is retransmitted by the first station, the time delay being sufficiently long to allow the first station to retransmit the signal within the time delay,
   the first station comprises a timer for measuring a time between the trigger event and the transmission of the signal comprising information relating to the trigger event, the information relating to the trigger event including the time measured by the timer, the retransmitted signal comprises updated data relating to the time of the trigger event, and the delay between each trigger event and a resulting machine station probe output is substantially constant.

2. A transmission system according to claim 1 wherein the transmission system uses a worldwide license free radio frequency band.

3. A transmission system according to claim 1 wherein the first and second stations are provided with a clock and wherein the clocks are synchronised at least once.

4. A transmission system according to claim 3 wherein the first station transmits a regular transmission and wherein when the second station receives the signal it will synchronise its clock with the first station.

5. A transmission system according to claim 4 wherein when the first and second stations are synchronised, their frequency hopping is synchronised.

6. A transmission system according to claim 1 wherein the first station transmits a regular transmission and wherein the information relating to the trigger event is transmitted in an additional transmission.

7. A transmission system according to claim 1 wherein, in the event of the first station receiving a transmission from the second station, a trigger event is performed by the measurement device and the first station transmits information relating to said trigger event.

8. A transmission system according to claim 1, wherein the first station transmits a regular signal and wherein if the second station receives the regular signal it will synchronise with the first station;

wherein, in the event of the trigger event, the first station transmits information relating to the trigger event in the form of an additional signal which includes data relating to a time of the trigger event; and wherein the second station is provided with means for receiving said data representing the time and providing a probe output signal derived therefrom.

9. A transmission system according to claim 1 wherein if the second station receives the signal transmitted by the first station, it transmits an acknowledgement signal and if the first station does not receive an acknowledgement signal in response to its signal, it will re-transmit said signal.

10. A transmission system according to claim 1 wherein the transmission system comprises a half duplex link.

11. A transmission system according to claim 1 wherein a master clock is provided at one end of the transmission system and a sliding correlator is provided to recover the master clock.

12. A transmission system according to claim 1 wherein a master clock is provided at one end of the transmission system and wherein the master clock provides a reference for the measurement device output signal time delay.

13. A transmission system according to claim 11 wherein if the second station receives a signal from the first station it transmits an acknowledgement signal and wherein the acknowledgement signal is synchronised with the master clock.

14. A transmission system according to claim 1 wherein a signal sent between the first and second stations comprises data bits and wherein data bits relating to more important information are provided with greater error protection than other data bits.

15. A transmission system according to claim 14 wherein the data bits relating to more important information may be provided with a higher hamming distance than other data bits.

16. A transmission system according to claim 1 wherein the first station transmits regular signals and wherein the first station has a mode and wherein each regular signal asks if the first station should change mode, and wherein if the first station receives an affirmative response, it changes mode.

17. A transmission system according to claim 1 wherein if the first and second stations are not synchronised, the first and second stations will hop between frequency channels at different rates until the second station receives a signal and synchronises with the first station.

18. A transmission system according to claim 1 wherein if the second station detects background noise above a predetermined level on the selected frequency channel, it will change to a different frequency channel.

19. A transmission system according to claim 1 wherein the first station has an ID code and wherein the second station can be set to only communicate with the said first station having said ID code.

20. A transmission system according to claim 1 wherein the first station is provided with a mode in which it transmits a signal containing its ID code and the second station is provided with a mode in which on receiving said signal, it is set to only communicate with the first station having this ID code.

* * * * *